US012326873B2

(12) United States Patent
Aseev et al.

(10) Patent No.: US 12,326,873 B2
(45) Date of Patent: Jun. 10, 2025

(54) SYSTEM AND METHOD OF BLOCKCHAIN LEDGER DATA TRANSFER AND REPLICATION

(71) Applicant: Chainstack Pte. Ltd., Singapore (SG)

(72) Inventors: Evgeny Aseev, Singapore (SG); Laurent Dedenis, Singapore (SG); ALeksandr Brilliantov, Singapore (SG); Serg Bell, Singapore (SG); Stanislav Protasov, Singapore (SG)

(73) Assignee: Chainstack Pte. Ltd., Singapore (SG)

( * ) Notice: Subject to any disclaimer, the term of this patent is extended or adjusted under 35 U.S.C. 154(b) by 115 days.

(21) Appl. No.: 18/054,910

(22) Filed: Nov. 13, 2022

(65) Prior Publication Data

US 2024/0160640 A1 May 16, 2024

(51) Int. Cl.
*G06F 16/20* (2019.01)
*G06F 11/14* (2006.01)
*G06F 16/27* (2019.01)

(52) U.S. Cl.
CPC .......... *G06F 16/27* (2019.01); *G06F 11/1469* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 10,839,377 B2 | 11/2020 | Scrivner et al. | |
| 10,984,206 B2 * | 4/2021 | Hu | G06Q 20/386 |
| 11,080,144 B2 | 8/2021 | Scrivner et al. | |
| 11,194,791 B1 | 12/2021 | Baine et al. | |
| 11,316,921 B2 | 4/2022 | Zeng et al. | |
| 11,604,631 B2 | 3/2023 | Wang | |
| 11,645,303 B2 | 5/2023 | Liu | |
| 11,665,234 B2 | 5/2023 | Zhan et al. | |
| 2019/0065092 A1 * | 2/2019 | Shah | G06F 11/1076 |
| 2020/0218815 A1 * | 7/2020 | Haque | G06F 16/1824 |
| 2020/0242592 A1 * | 7/2020 | Scrivner | G06F 16/2365 |
| 2020/0244652 A1 * | 7/2020 | Iyer | H04L 9/0637 |
| 2020/0267187 A1 * | 8/2020 | Singh | G06F 21/57 |
| 2020/0320220 A1 * | 10/2020 | Beno | G06F 16/27 |
| 2020/0334110 A1 | 10/2020 | Song et al. | |
| 2021/0117385 A1 * | 4/2021 | Haldar | G06F 16/128 |
| 2021/0176160 A1 | 6/2021 | Yang et al. | |
| 2021/0326212 A1 * | 10/2021 | Scrivner | G06F 16/2379 |

(Continued)

*Primary Examiner* — Jau Shya Meng
(74) *Attorney, Agent, or Firm* — ESPE Legal Consultancy FZ-LLC (57) ABSTRACT

The present disclosure relates to a system and method for synchronizing nodes and snapshot data, independent of cloud infrastructure. The system includes a blockchain node management server, a node synchronization automation module, and a cluster of synchronized blockchain nodes implemented on the cloud. The blockchain node management server generates a new node, and the node synchronization automation module, using an automation engine, configures the node, deploys the node onto the blockchain network, and synchronizes the node with other blockchain nodes. A blockchain node synchronizes with the node of the blockchain network, reflects change in data in a chain data disk, and a snapshot of the chain data disk is created. Snapshots of different nodes are synchronized, independent of the infrastructure environment.

20 Claims, 6 Drawing Sheets

(56) References Cited

U.S. PATENT DOCUMENTS

2021/0326300 A1 10/2021 Luo
2023/0102162 A1* 3/2023 Santana De Oliveira .................. G06F 16/2365
707/690
2024/0152403 A1* 5/2024 Fahlbusch ............. G06F 9/5016

* cited by examiner

SYSTEM AND METHOD OF BLOCKCHAIN LEDGER DATA TRANSFER AND REPLICATION

FIELD OF THE INVENTION

The present disclosure generally relates to blockchain technology. In particular the present disclosure relates to a system and method for spinning up blockchain nodes using data snapshots that function independently of compute and storage platforms.

BACKGROUND OF THE INVENTION

Organizations deploy compute and storage platforms that have their own limits and policies. A blockchain network may comprise many nodes with new nodes added frequently. Each node potentially stores large amounts of data and synchronizing a new node with other nodes may involve synchronizing paramount data. Therefore, synchronizing the nodes on compute and storage platforms may take a relatively long time, and may even be measured in weeks. Moreover, each compute and storage platform, such as Microsoft Azure, Google Cloud Platform (GCP), or Amazon Web Services, has its own security and usage policy. Each client, such as a nodes cluster of the blockchain network, must abide by specific policies. Further, running blockchain nodes on different compute and storage platforms requires specific approaches to create, maintain, and use chain data snapshots. For example, if the nodes are implemented on Amazon Web Service (AWS), one will have to utilize AWS platform specific tools for creating, managing, and restoring the nodes from the AWS cloud. In one example, restoring a volume from a snapshot in AWS with size above 250 Gb, without using Fast Snapshot Restore (FSR) feature, is a time-consuming task. Execution of such tasks takes a relatively long time, usually exceeding Service Level Agreement, executed between a service provider and a customer, or a speed of operation acceptable to the service provider and the customer. Therefore, it is evident that, for each Cloud Service Provider (CSP), a client must avail a CSP specific tool and build operational set up, including the skilled personnel trained to operate the CSP specific tools. For example, a first team manages the AWS platform, a second team manages Azure, and a third team manages GCP platform and so on. These limitations result in time consuming, labor extensive and costly blockchain node management.

Therefore, there is a need for a blockchain node management system that can spin up nodes and restore snapshot data quickly and independently of CSP-specific tools.

SUMMARY OF THE INVENTION

The present disclosure relates to blockchain technology. In particular the present disclosure relates to a system and method for blockchain ledger data transfer and the replication, where snapshots are replicated and new nodes can be spun up by using the replicated snapshots to reduce the nodes synchronization time, ultimately facilitating faster data transfer.

The system comprises a blockchain node management server, a node synchronization automation module, a set of blockchain nodes of a blockchain network, a downloader and uploader, and a snapshot storage.

In an exemplary implementation, the blockchain node management server is configured to manage service requests from a user device to create a new node. Based on the user's request, the blockchain node management server is enabled to create a new node and deploy the node service on the node according to a node deployment request.

In an exemplary implementation, the node automation module is communicatively coupled to the blockchain node management server to receive a node deployment request from a user. The node automation module includes a node validation module, a node configuration automation module, a snapshot synchronizer, and a chain data manager.

According to the exemplary implementation, the node validation module performs tests to validate the integrity of transactions stored on the node. The node configuration automation module is enabled to configure a node for a deployment on the blockchain network and for storing and processing the transaction related data on the node. The snapshot synchronizer is configured to facilitate synchronization between one or more snapshot storages. The chain data manager is enabled to monitor one or more parameters of the blockchain, such as version or network. In one implementation, all components of the node synchronization automation module are configured to operate independent of each other.

In an exemplary implementation, the blockchain network includes the set of blockchain nodes communicatively coupled to the node synchronization automation module. The set of blockchain nodes is distributed within the network as such the first subset of the nodes is implemented at one location or, second subset of the nodes is implemented at another location, and such.

In an exemplary implementation, a downloader and uploader are communicatively coupled to the set of synchronized nodes of the blockchain network for uploading and downloading the snapshot data to the snapshot storage.

In an exemplary implementation, the snapshot storage is communicatively coupled to the downloader and uploader and is provided to store the snapshot data. In one example, the snapshot storage can be a cloud storage. In another example, the snapshot storage can be configured on a virtual machine accessing a remote hard disk. The snapshot storage can be dedicated to a location of a cloud service provider where a set of blockchain nodes is implemented. Likewise, each location may have dedicated snapshot storage. All snapshot storages, corresponding to different locations, are synchronized with a central snapshot storage. Each snapshot storage is also synchronized with other snapshot storages connected in a peer-to-peer network.

In one implementation, the node synchronization automation module is enabled to synchronize a new node with other nodes in the blockchain network.

In one implementation, the snapshot service is configured to generate a snapshot after a predefined time interval. The snapshot service is also configured to capture incremental updates and accordingly update the previously captured snapshot for updated portions only.

In one implementation, each snapshot is stored at the snapshot storage and that can be retrieved later if requested.

In one embodiment, a method to implement a system for cloud infrastructure independent synchronization of blockchain nodes and corresponding snapshots is disclosed. The method mainly includes initialization of a blockchain node, creating a snapshot file, and storing the snapshot file in a snapshot storage. In one example, the snapshot storage can be a virtual disk.

In one implementation of the embodiment, a snapshot of a blockchain node storage is captured at snapshot service in accordance with predefined synchronization policy. The captured snapshot is then uploaded to object storage. According to an implementation, the blockchain snapshot file is overwritten with a new version of the captured blockchain snapshot file at the object storage. When the new snapshot file is prepared, a new dedicated blockchain node is initialized for deployment in the blockchain network. In one implementation, a virtual disk is created from the blockchain snapshot file. According to one implementation, the virtual disk is mapped to the dedicated workload.

In one implementation of the exemplary embodiments, the set of blockchain nodes are connected within a blockchain network.

In one implementation, each of the one or more cloud service providers include a snapshot service.

In one implementation, each snapshot is labeled with tag information. The tag information, in an example, can be a timestamp of the snapshot creation.

In one implementation, the predefined time interval for snapshot generation is based upon a node synchronization policy.

In one implementation, the blockchain network is implemented on one or more virtual servers, and each virtual server contains one or more nodes and an Application Programming Interface (API) container.

In one implementation, at least one virtual server is connected to a hosting facility, and the hosting facility data storage is a chain data disk corresponding to at least one node.

In one implementation, the snapshot storage is a cloud storage container.

In one implementation, one or more nodes are grouped to form a cluster, and one or more clusters are located at different locations.

In one implementation, one or more clusters stored at one location comprises a snapshot storage dedicated to the location specific one or more clusters.

In one implementation, one or more clusters stored at one location comprises the downloader and uploader dedicated to the location specific one or more clusters, and the downloader and uploader are cloud-independent components.

In one implementation, the blockchain nodes from the one or more clusters are synchronized by using the node synchronization automation module irrespective of location and blockchain platform infrastructure of the one or more clusters.

DETAILED DESCRIPTION

The embodiments will now be described more fully hereinafter with reference to the accompanying figures.

To provide an overall understanding of the systems and methods described herein, certain illustrative embodiments will now be described, including systems and methods for storing trusted data at a cloud storage service. The system comprises a single computing device or multiple computing devices working collectively. Thus, the storage of data and the execution of functions are spread out among one or more computing devices.

Individual users log onto the system to access the blockchain. Typically, the user is required to be authorized and authenticated in order to access the system. Accordingly, in some embodiments, the user is an employee of the entity, such as an administrator.

Networked computing devices are used to access the permissioned blockchain or serve as the node on which the permissioned blockchain is implemented. A typical computing device includes a processor, a non-transitory storage medium, a communications device, and a display. The computing system supports user logins and inputs from any combination of similar or disparate devices. In some embodiments, the computing system is a local or remote server which is configured to send or receive inputs from other computing systems on the network.

Data is associated with the resource transfer. In particular, data or a data file may contain information needed to complete the resource transfer.

Blockchain comprises a distributed electronic ledger of data records which are authenticated by a consensus mechanism. Multiple computing systems are within the blockchain. These "nodes" or "compute nodes" comprise a copy of the entire ledger of records. Accordingly, the record of transactions is not dependent on a single database which may serve as a single point of failure; the blockchain will persist so long as the nodes on the blockchain persist. Nodes may write a "block" to the blockchain, where the block may comprise transaction data and metadata, including a reference to the previous "block" in the chain. In some embodiments, "data record" or "transactional record" may refer to data associated with a resource transfer which is stored in a block on the blockchain. By linking blocks in this way, the blockchain contains a reliable history of all relevant records of data and resource transfers between entities. In some embodiments, the data may relate to a financial transaction. In other embodiments, the data is files or records belonging to an individual or entity. The block may further comprise a time stamp and a pointer to the previous block in the chain, where the pointer is a fixed-length hash generated by a hash algorithm.

In some embodiments, a given computing system may represent multiple systems configured to operate in a distributed fashion. In other embodiments, the functions of multiple computing systems are accomplished by a single system.

The system for cloud independent nodes and snapshot synchronization is described with reference to FIGS. 1-7 in the present disclosure. The system mainly includes a node synchronization automation module that replicates blockchain data snapshots between different hosting facilities to facilitate the bootstrapping of new nodes from the snapshots. The system is also enabled to synchronize snapshot storages corresponding to different cloud service providers and/or virtual machines having hard disk storages.

Figure 1:
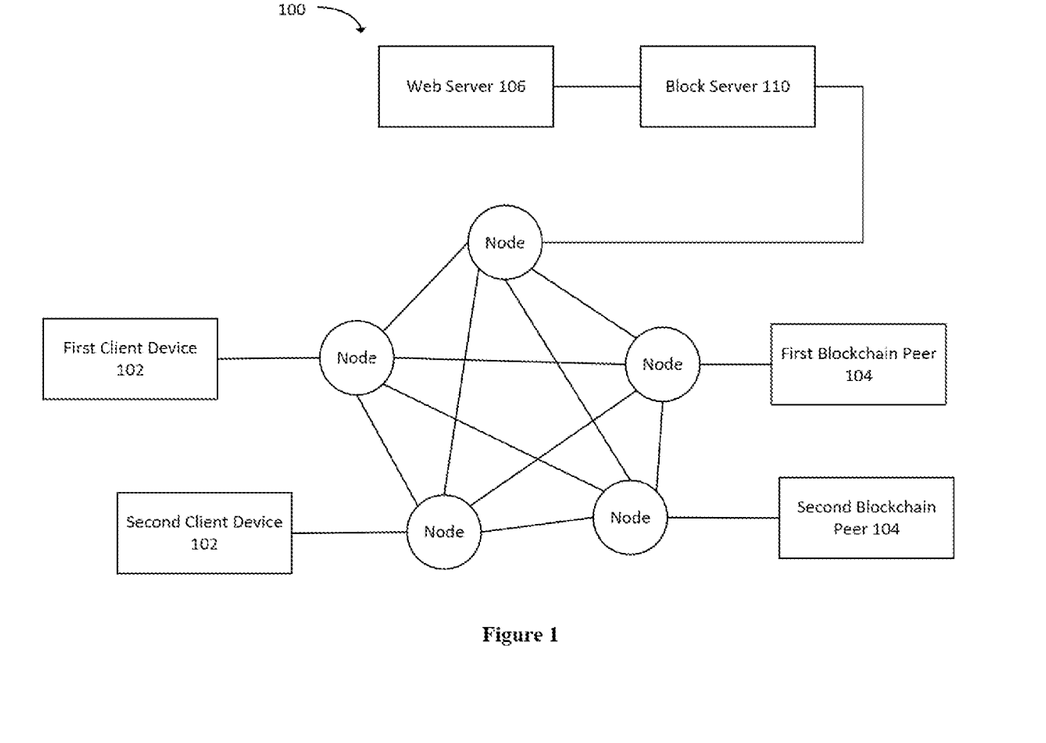
FIG. 1 presents a general blockchain environment for facilitating service requests, in accordance with one embodiment of the present invention

FIG. 1 presents a general blockchain environment 100 for facilitating service requests, in accordance with one embodiment of the present invention. The blockchain network 100 typically comprises a plurality of nodes, each of which are connected to one another over a network, and each of which comprises a complete copy of the blockchain. The network is typically a global area network (GAN), such as the Internet, a wide area network (WAN), a local area network (LAN). The network may provide for wireline, wireless, or a combination of wireline and wireless communication between devices on the network. The nodes maintain the blockchain and add new blocks to the blockchain using a consensus algorithm. Addition of data records to the blockchain may occur only through consensus. Typically, consensus is reached when a threshold number of nodes have voted to validate the pending data record. Once the pending data record has been validated, the pending data record is appended to the blockchain and becomes immutable. Each node may thereafter update its copy of the blockchain accordingly to ensure consistency of records amongst the nodes.

In some embodiments, each entity includes a client device 102 connected to a node. One or more of the client devices 102 may include a client application to interact with the blockchain node. In one implementation, the client application may request a blockchain API to write data onto the blockchain or read data from the blockchain.

The blockchain server 110 hosts the software and data comprising the protocols necessary to run the various distributed applications.

In one embodiment, the client device 102 of the blockchain network includes a computing system connected to the Internet. Such a configuration is typically used for computers connected to the Internet and executing server or client software.

Figure 2:
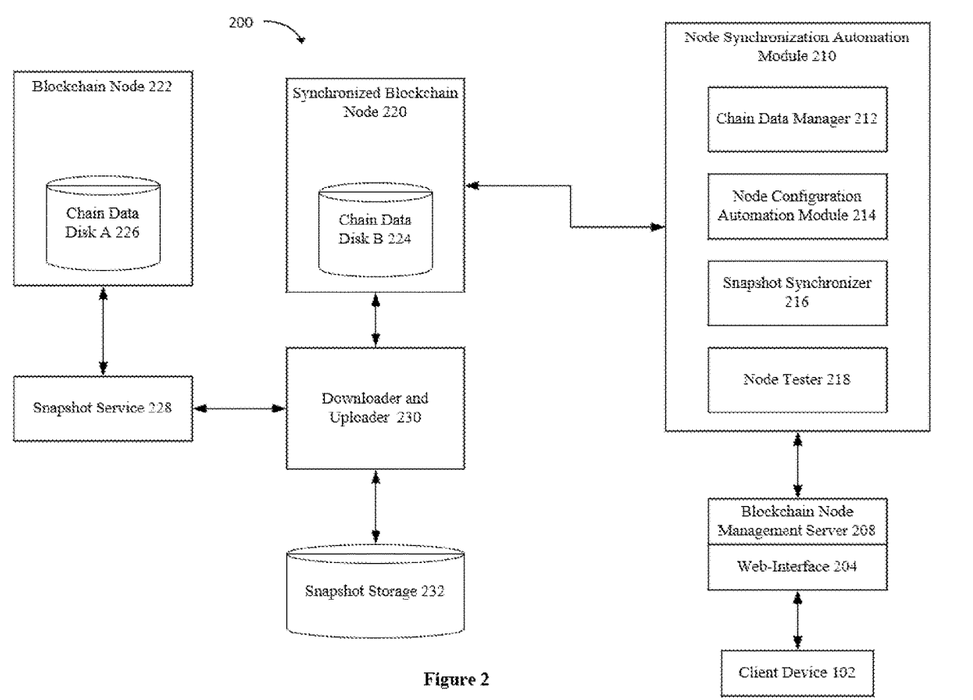
FIG. 2 shows functional block diagram of the system, in accordance with one embodiment.

FIG. 2 shows a functional block diagram of the system, in accordance with one embodiment. The system comprises a client device, a blockchain node management server 208, a node synchronization automation module 210, a synchronized blockchain node 220, a blockchain node 222, a snapshot service 228, a downloader and uploader 230, and a snapshot storage 232.

In one embodiment, the client device is communicatively coupled to the blockchain node management server 208, and the blockchain node management server 208 receive a client request for mining and transaction from the client device.

The blockchain node management server 208, in one implementation, is connected to a client device via a web-interface 204. The blockchain node management server 208 is implemented to create a node based on a user's request. In one implementation, the blockchain node management server 208 is an application installed on the client device. In one implementation, the blockchain node management server 208 is a standalone server or system or part of the foundation server. The blockchain node management server 208 may receive a node deployment request, alternatively referred to as a user request, from a user, The user request may relate to mine a transaction on the blockchain network, in one example. In another example, the user request may relate to executing a transaction on the blockchain network.

According to one embodiment, the blockchain node management server 208 may felicitate the user request via a web interface 204. According to one embodiment, the web interface 204 may include one or more devices for enabling communication with a client. In some embodiments, the web interface 204 may include a command line interface or graphical web interface that is presented to another or remote terminal via the network interface. For example, the web server is coupled to the client device and the blockchain node management server 208.

In accordance with one embodiment, the blockchain node management server 208 can include a network interface (not shown in the Figure) may include one or more devices for enabling communication with other hardware devices. For example, a network interface may include a network interface card (NIC) configured to communicate according to the Ethernet protocol. Additionally, the network interface may implement a TCP/IP stack for communication according to the TCP/IP protocols. A 4G/5G/LTE, Wi-fi, or any other wireless protocol may similarly be used. Various alternative or additional hardware or configurations for the network interface will be apparent to one of skill in the art.

In one embodiment, the blockchain node management server 208 is communicatively and bi-directionally coupled to the node synchronization automation module 210. The node synchronization automation module 210 is configured to perform blockchain nodes and corresponding snapshots synchronization in automated mode. At the node synchronization automation module 210, a new node to be deployed is received from the blockchain node management server 208, configured and tested the node, and synchronized the node with other nodes of the blockchain network. According to the embodiment, the node synchronization automation module 210 may include, but may not be limited to, one or more components, such as a node tester 218, a node configuration automation module 214, a snapshot synchronizer 216, and a chain data manager 212. The components are controlled by the node synchronization automation module 210, but each component functions independently of the other components.

In accordance with one embodiment, the chain data manager 212 is configured to manage block chain data processing, node synchronization, and blockchain data storage. In particular, the chain data manager 212 is implemented as a data controller and monitoring and validating tool. In one implementation, the chain data manager 212 can be implemented as an evaluation system or a blockchain risk framework or a combination thereof. In one implementation, the chain data manager 212 as the evaluation system may function as a blockchain assurance software that enables data activity-level assurance for any given blockchain-based data storage system use case.

In one implementation, the blockchain risk framework is used to evaluate the current state of a blockchain-based data storage system use case against different risk categories and sub-categories. For example, the blockchain risk framework may monitor the storage system to determine whether the storage system is active or not. Using the data gathered, for example, data gathered by the blockchain risk framework or data gathered by external framework or application, the chain data manager 212 is configured to perform real-time validity testing of data activities in one or more data blocks of the blockchain-based data storage system and produce continuous reporting on blockchain state in real time. As known in the art, the blockchain is a distributed network having the nodes implemented at various locations, for example, various CSPs and various bare-metal infrastructures. The one or more nodes implemented at the same location can be clustered and provided with a shared storage or a dedicated storage. The chain data manager 212, in one implementation, is configured to monitor the storages at various locations to determine if the specific location is ready to receive the new node.

In one implementation, the chain data manager 212 is configured as a version control tool that receives a node deployment request from a user that would require access to a licensed blockchain management software, the chain data manager 212 may determine the current version of the blockchain, and subsequently, whether a user has accepted license terms for a current version of the software application. If the versions are same, the chain data manager 212 may receive a test report from a node tester 218 (described in subsequent paragraphs) that validates the integrity of services performed by the new node whether it is ready for functioning, and thereby, initiate node synchronization process, if the integrity of service is validated.

According to one embodiment, the node configuration automation module 214 is provided to automate the configuration of the node, based upon the user's request, for the deployment in the blockchain network. In one implementation, an automation engine can be deployed on the node automation module to automate the process of node configuration and synchronization module. In an example, the automation engine can automate various processes including cloud provisioning, configuration management, application deployment, intra-service orchestration and such. The automation engine, designed for multi-tier developments, is configured to model the infrastructure by how the system components interrelate. Few examples of the automation engine may include ansible playbook, attune, puppet lab, terraform, chef, SaltStack, and the like.

The node configuration automation module 214 is enabled to configure one or more parameters relating to configuration of the node required for the deployment of the node. In one implementation, the configuration information may include blockchain node address(es). In one implementation, the node configuration automation module 214 may consider the user's request and configuration information provided by the user for node configuration. The user provided configuration information, in one implementation, may include, but may not be limited to, an IoT device ID, blockchain configuration parameters including an alliance name, an alliance domain name, a region, a specification, organization information, etc., and such. The required configuration information may not be the same for different service providers and can be specifically determined according to a service provider and an actual application scenario.

In one embodiment, the node configuration automation module 214 may consider identification information for configuring the node. The identification information is related to a device associated with the user and blockchain node configuration parameters. The blockchain node configuration parameters may include, for example, a number of blockchain nodes that need to be configured or other related configuration parameters.

In one embodiment, the generated node is configured by using configuration information (e.g., command-line arguments, a configuration file, etc.). In one embodiment, the configuration information identifies at least one of: node implementation, network, version, and specialization. For example, configuration can include: "implementation: parity".

In one exemplary embodiment, a node tester 218 of the node synchronization automation module 210 is configured to perform systematic evaluation of the functional parameters of the blockchain. For example, mining, transactions, wallets, and such parameters are tested. In one implementation, the node tester 218 may perform functional testing to determine the effectiveness of the function components of the blockchain system. In one implementation, the node tester 218 may perform performance testing of the production environment, such as a level of transaction and the delay in processing the transaction. For example, to initiate a Bitcoin transaction, miners need to confirm and validate the transaction which may get delayed due to a surge in usage. In one more implementation, the node tester 218 may perform node testing on all heterogeneous nodes independently to check validity to make successful transactions. In accordance with one implementation, the node tester 218 may perform a security test to identify the integrity of the blockchain network. One or more security parameters, such as access and authentication, secure hash, wallet signature, private keys, vulnerability assessment, validating information and such, is considered for the testing. In one example, various testing scripts or tools are implemented to perform tests.

In one exemplary embodiment, the snapshot synchronizer 216 of the node synchronization automation module 210 is configured to synchronize one or more snapshot storage 232 located at different locations. The term snapshot storage 232 refers to the hardware and software components that provide physical storage media to applications running on the host operating system. In typical blockchain infrastructure different clusters of the nodes are located at different locations. Each location may comprise at least one snapshot storage 232 to store snapshots. Snapshot storages 232 from each location of the blockchain network are synchronized.

As described with reference to FIG. 2, a node synchronization automation module 210 may automate synchronization of new blockchain nodes with the other blockchain nodes connected in the blockchain. According to one exemplary embodiment, each of the set of blockchain nodes is synchronized with each other by mounting snapshot data of the first set of blockchain nodes on a snapshot storage or a virtual disk of the second set of blockchain nodes for mapping the blockchain data. Each node may include a respective chain data disk B 224. Chain data disk B 224, corresponding to multiple sets of synchronized nodes, is referred to as chain data disk B 224, collectively or individually. Further, the set of blockchain nodes may include a blockchain node 222 having a chain data disk A 226. As known in the art, the blockchain node 222 is responsible for light-weight cluster-wide actions, such as creating and deleting an index, tracking which nodes are part of the cluster, and deciding which shard to allocate which nodes. Each chain data disk B 224 may contain data related to node service, for example, transaction. Metadata, hash, and content of the chain data disk B 224 are mapped in the chain data disk A 226.

According to one embodiment, a snapshot service 228 is coupled to the blockchain node 222 for snapshotting the chain data disk A 226. In one implementation, capturing the snapshot may include synching backup data from the chain data disk B 224 with the chain data disk A 226, and by taking point-in-time snapshots or incremental snapshots.

In one implementation, the snapshot is captured periodically (e.g., after a fixed time interval) irrespective of node synchronization activity detected. The time interval between two snapchat captures, is based upon security and usage policy of the blockchain network. For example, if the blockchain network has a node synchronization policy with fixed time interval, based upon node synchronization policy and time interval, the snapshot capture is scheduled.

In one implementation, incremental snapshots are captured. The incremental snapshot may involve synchronizing data such that only nodes that have changed after the most recent snapshot are saved (e.g., only the deltas are synced).

Capturing snapshots minimizes the time required to synchronize from backup data, and potentially saves on storage costs by not duplicating data. In some embodiments, incremental backup involves synchronizing a blockchain's chain state to a snapshot storage 232 such that only nodes that have changed after the most recent snapshot are saved.

In one implementation, when deleting a snapshot, only the data unique to that snapshot is removed, not the full chain state data. Each snapshot contains all of the information needed to restore data from the moment when the snapshot is taken to a new datastore volume.

In one implementation, the snapshot service 228 is installed at the same location as the node cluster is located. The snapshot service 228 is coupled to the blockchain node 222 within the same environment and on the same infrastructure. Implementing the snapshot service 228 in the same infrastructure may save the data transmission cost, resulting in a cost-effective system.

In one implementation, the snapshot service 228 is installed as a remote datastore (e.g., Amazon Elastic Block Store (EBS)) that is communicatively coupled to the blockchain platform and has access to each location. In some implementations, the datastore is implemented by one or more hardware servers. In some implementations, nodes of the blockchain platform store chain-state in datastore volumes managed by the datastore, and a component of the blockchain platform, such as a parent node or a child node, controls the datastore to generate a snapshot by sending a request to the datastore via an API of the datastore.

In one implementation, the snapshot is labeled by tag information in the API for identification. In some embodiments, the tag information may include at least four different tags. In some embodiments, the tag information includes information identifying at least one of the following attributes of the node: implementation, network, version, and specialization. For example, the tag information can include: "implementation: parity".

In some embodiments, the snapshot tag information identifies an implementation, network, specialization, version, and time stamp associated with the snapshot, and the configuration of the node to be synched identifies an implementation, network, specialization, and version. However, the snapshot tag information can include any other suitable metadata or information associated with the snapshot including the snapshot process, snapshot content, etc.

In one exemplary embodiment, the downloader and uploader 230 is coupled to the snapshot service 228 and the synchronized blockchain node 220. The downloader and uploader 230, in one example, is a file synching tool for updating the cloud files in a cloud. The downloader and uploader 230 are implemented at infrastructure on which the cluster of blockchain nodes is deployed to perform file processes, such as downloading a file from one component, uploading the file at another component and such. In one example, the downloader and uploader 230 is a Rclone tool.

In one exemplary embodiment, the snapshot storage 232 is coupled to the downloader and uploader 230 for storing the snapshots downloaded from the snapshot service 228. In one implementation, the snapshot storage 232 is installed at the same location as the node cluster is located. The snapshot storage 232 is coupled to the snapshot service 228 within the same environment and on the same infrastructure. Implementing the snapshot storage 232 in the same infrastructure may save the data transmission cost, resulting in a cost-effective system.

In one implementation, the snapshot storage 232 module is installed as a remote datastore (e.g., Amazon Elastic Block Store (EBS)) that is communicatively coupled to the blockchain platform and has access to each location. In one implementation, the remote datastore may serve as the snapshot storage 232 for all the clusters of the blockchain network implemented at various locations. In one implementation, the remote datastore may serve as a dedicated snapshot storage 232 for each cluster.

In one exemplary embodiment, the blockchain cluster along with the snapshot storage 232 is implemented as virtual functions. For example, Amazon Web Services, Google Cloud Platform, Microsoft Azure, systems or functions are used for hosting the blockchain cluster and the snapshot storage 232. Further, one or more virtual machines running on shared hardware is utilized as the snapshot storage 232. One or more methods, such as Network Functions Virtualization (NFV) on Software Defined Networks (SDN), are implemented to operate the blockchain cluster and the snapshot storage 232.

Figure 3:
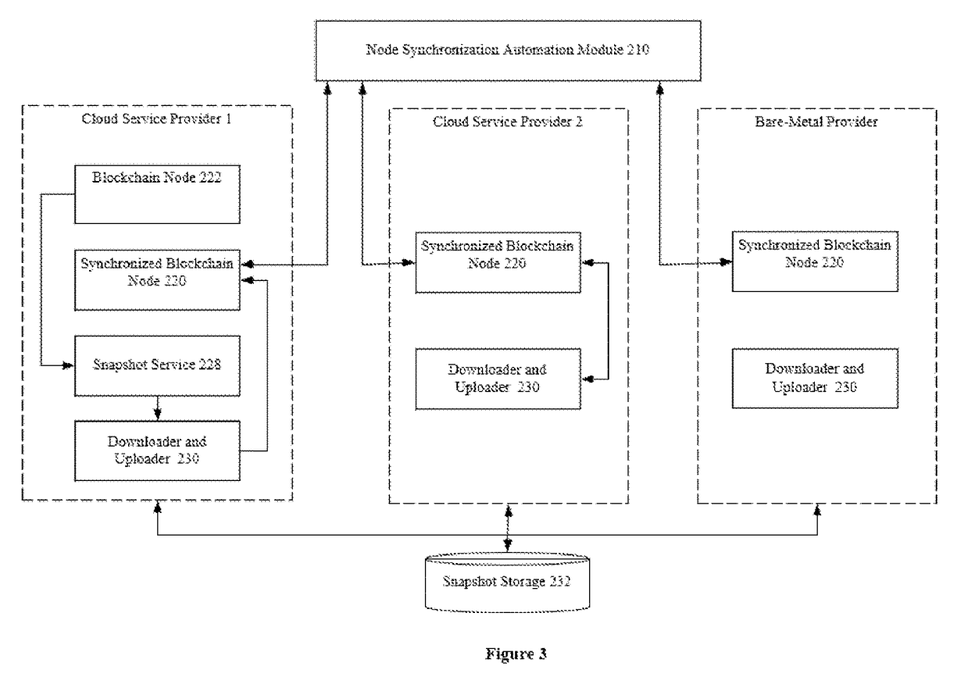
FIG. 3 shows a block diagram illustrating the node synchronization automation module interconnected with one or more cloud service providers, in accordance with one embodiment.

FIG. 3 shows a block diagram illustrating the node synchronization automation module 210 interconnected with one or more cloud service providers, in accordance with one embodiment. As shown in the Figure, the node synchronization automation module 210 can be implemented on a remote server but it is communicatively coupled to each compute and storage platforms, including CSPs or bare-metal providers, on which the blockchain network has been implemented. As described earlier with reference to FIG. 2, the node synchronization automation module 210 is configured to automate node configuration for its deployment in the blockchain network. The node synchronization automation module 210 is enabled to determine the location of the node deployment, and subsequent synchronization of the node, outside the blockchain network. The aspect of the disclosure that the node synchronization automation module 210 is outside the blockchain network and independent of compute and storage platforms, the system is rendered as infrastructure independent.

In one exemplary embodiment, the blockchain clusters are implemented on various locations. For example, the first cluster is implemented on the first CSP (e.g., AWS), the second cluster is implemented on the second CSP (e.g., Azure), and the third cluster is implemented by the first bare-metal provider. Each cluster may include one or more blockchain nodes with chain data disk B 224 (not shown in the Figure) synchronized with the chain data disk A 226 of the blockchain node 222, and snapshots are captured of the chain data disk. Snapshots captured by the snapshot service 228 are uploaded to the snapshot storage 232 by the downloader and uploader 230 module.

In one implementation, the snapshot service 228 is the CSP or bare-metal provider specific module. For example, in the implementation of the first cluster deployed on the AWS, the snapshot service 228 is an Amazon EBS snapshot tool. However, the snapshot storage 232, in one implementation, is configured outside the CSP or bare-metal infrastructure. In one example, the snapshot storage 232 is a remote data storage. In another example, the snapshot storage 232 is a cloud datastore. The snapshot data, captured by the snapshot service 228, is uploaded to the snapshot storage 232 via the downloader and uploader 230 module.

Figure 4:
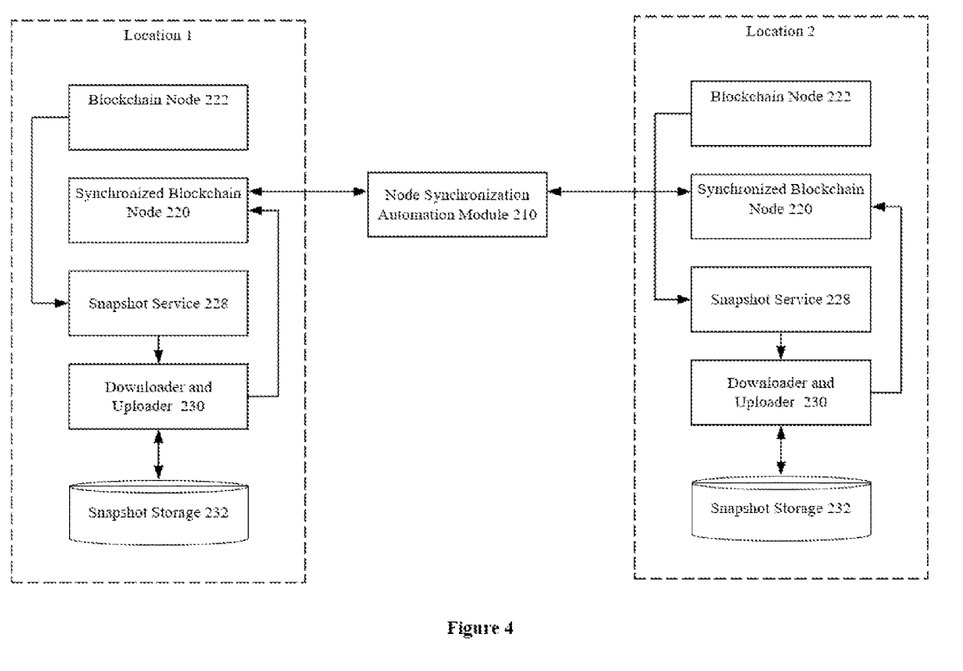
FIG. 4 depicts a block diagram illustrating node synchronization between blockchain nodes located at two different locations, in accordance with one embodiment.

FIG. 4 depicts a block diagram illustrating node synchronization between blockchain nodes located at two different locations, in accordance with one embodiment. FIG. 3 depicted the clusters being deployed at different infrastructure environments, whereas FIG. 4 depicts the clusters being deployed at different locations. Each cluster, located at different locations, may include a set of synchronized nodes, a blockchain node 222, a snapshot service 228, a downloader and uploader 230 module, and a snapshot storage 232.

In one example, the cluster is implemented on one CSP. In this scenario, the snapshot storage 232 is a portion of the data store of the CSP. In another example, the cluster is implemented on the bare-metal provider. In this scenario, the snapshot storage 232 is a part of a physical memory associated with the bare-metal provider. The snapshot storage 232 is locally installed, according to one implementation, which results in omission of the data transmission requirement. The snapshot data can be stored faster and effectively.

In one implementation, irrespective of locations of implementation of different clusters, the set of synchronized nodes of each cluster is synchronized by the node synchronization automation module 210. As the node synchronization automation module 210 is enabled to synchronize a new node with the nodes of the blockchain network, at the instance, a new node has been synchronized with all the clusters, a new snapshot is captured at all locations and stored into the respective snapshot storage 232, in accordance with one implementation. Locally installed snapshot storage 232 is synchronized, in one implementation.

Figure 5:
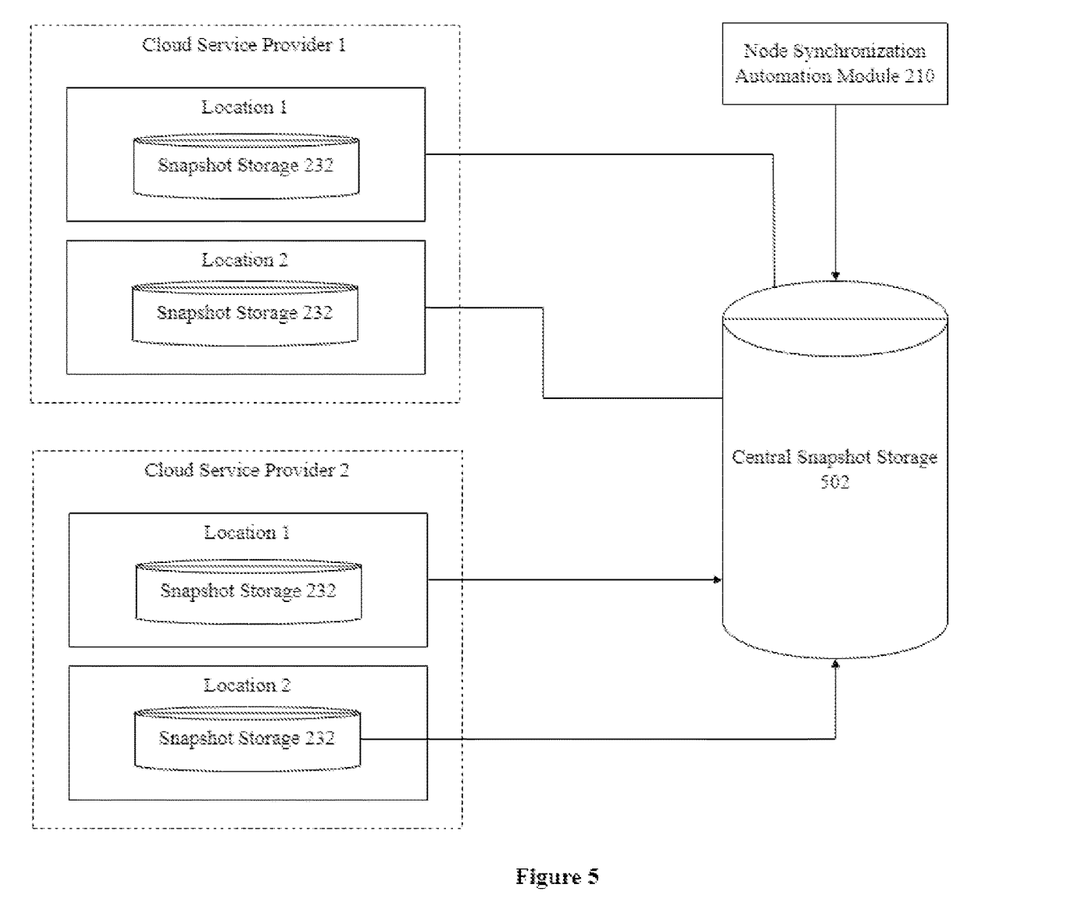
FIG. 5 shows method steps for implementing a standard synchronization protocol, in accordance with one embodiment.

FIG. 5 depicts synchronization of the snapshot storage 232 corresponding to one or more sets of blockchain nodes, implemented on one or more compute and storage platforms distributed at one or more locations, in accordance with one embodiment. In one implementation, the first set of the blockchain node is implemented on the first compute and storage platform located at the first location. In another implementation, the plurality of sets of blockchain nodes is implemented at the first compute and storage location located at a second location. In each implementation, each location may have a snapshot storage dedicated for that specific location. Each snapshot storage is virtually connected with a central storage.

As shown in the Figure, the plurality of sets of blockchain nodes is deployed on a plurality of compute and storage platforms. For example, the first set is implemented on AWS, whereas the second set is implemented on Azure. AWS and Azure are decentralized cloud services having data centers at one or more locations. For example, AWS may function from location A, location B and location C. Accordingly, the first cluster is deployed at location A, third cluster at location B, and fourth cluster at location C and so on. In another example, Azure, too, is implemented on the distributed network, therefore, having multiple locations for hosting client services, such as hosting blockchain clusters. Therefore, the fifth cluster is deployed at location D, sixth cluster at location E, and so on.

In one implementation, the node synchronization automation module 210 is coupled to each set of blockchain nodes from each compute and storage platform functioning at each location. The snapshot storage 232 of each set, in one implementation, is coupled to a central snapshot storage 502 that is configured to store synchronized data corresponding to each snapshot storage 232. The central snapshot storage 502, in one implementation, is controlled by the node synchronization automation module 210. In one implementation, the central snapshot storage 502 is a portion of data stored in a cloud. In another implementation, the central storage is a portion of physical memory of the bare-metal network.

In one implementation, the snapshot storages 232 are synchronized with the central snapshot storage irrespective of cloud infrastructure. In another implementation, each snapshot storage 232 is synchronized with other snapshot storages 232 in peer-to-peer connection. In one implementation, the snapshot service may capture a snapshot of updated data only, and corresponding snapshot, stored at the snapshot storage, is incrementally updated based on the updated portion only. Then after, all snapshot storage connected in Peer-to-Peer network may transmit these snapshot incremental updates for synchronization.

Figure 6:
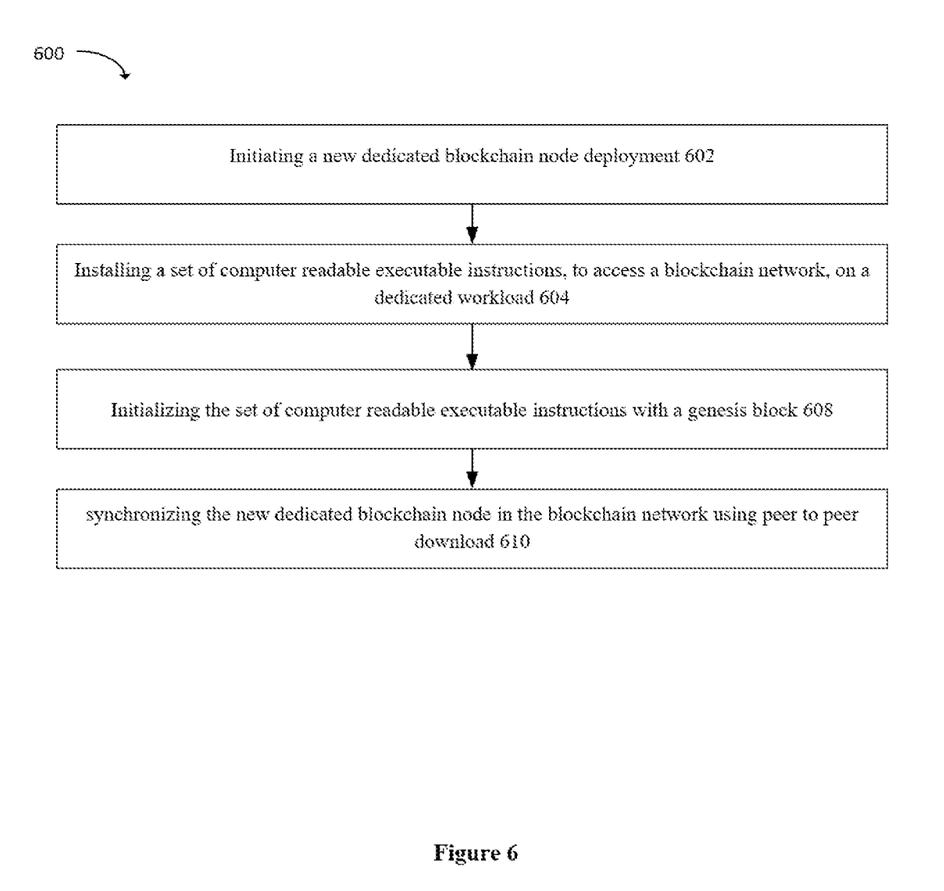
FIG. 6 shows method steps for implementing the system, in accordance with one embodiment.

FIG. 6 shows a method 600 for implementing a standard synchronization protocol, in accordance with one embodiment.

At method block 602, a new dedicated blockchain node deployment is initiated by the blockchain node management server 208, in accordance with one implementation.

At method block 604, a set of computer readable executable instructions, referred to as blockchain software hereinafter, is installed on a dedicated workload, in accordance with one implementation. The dedicated workload can be a client device.

At method block 606, the blockchain software is initialized with a genesis block of the blockchain network, in accordance with one implementation.

At method block 608, the installed blockchain nodes are synchronized with other nodes in the blockchain network using peer to peer downloading tools.

Figure 7:
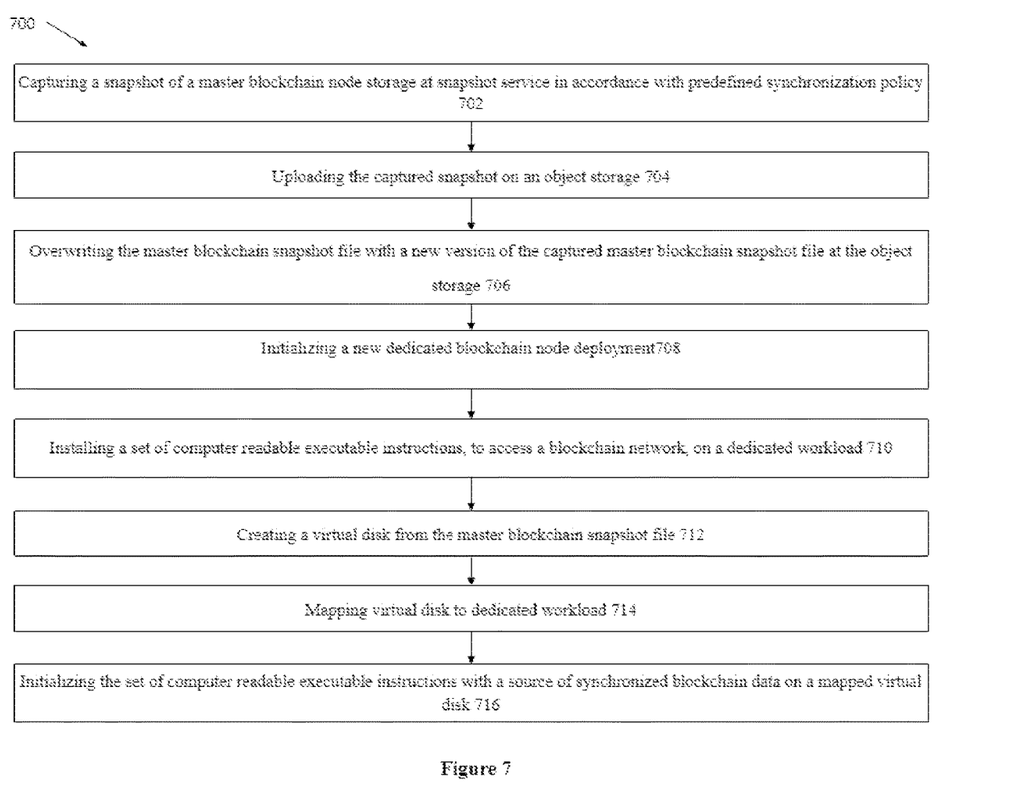
FIG. 7 shows a method 700 for implementing the system, in accordance with one embodiment.

FIG. 7 shows a method 700 for implementing the system, in accordance with one embodiment.

At block 702, a snapshot of a chain data disk A 226 is captured at snapshot service 228 in accordance with predefined synchronization policy, in accordance with one embodiment.

At block 704, uploading the captured snapshot on an object storage; in accordance with one embodiment.

At block 706, the blockchain snapshot file is overwritten with a new version of the captured blockchain snapshot file at the object storage; in accordance with one embodiment.

At block 708, a new dedicated blockchain node deployment is initialized; in accordance with one embodiment.

At block 710, a set of computer readable executable instructions is installed to access a blockchain network, on a dedicated workload; in accordance with one embodiment.

At block 712, a virtual disk from the blockchain snapshot file is created; in accordance with one embodiment.

At block 714, mapping virtual disk to dedicated workload; in accordance with one embodiment.

At block 716, initializing the set of computer readable executable instructions with a source of synchronized blockchain data on a mapped virtual disk; in accordance with one embodiment.

The invention claimed is:

1. A system for cloud infrastructure independent synchronization of blockchain nodes and corresponding snapshots comprising:
    a blockchain manager server;
    a node synchronization automation module positioned outside a blockchain network including the blockchain nodes, communicatively coupled to the blockchain node management server and including at least one processor and memory configured to store instructions, that when executed by the at least one processor, include:
        a node validation module positioned outside the blockchain network including the blockchain nodes and configured to validate the integrity of transactions stored on the node, a node configuration automation module positioned outside the blockchain network including the blockchain nodes and configured to configure a node for deployment on a blockchain network and process a transaction on the node, a snapshot synchronizer positioned outside the blockchain network including the blockchain nodes and configured to be communicatively coupled to at least two snapshot storages, a first snapshot storage at a first location, and a second snapshot storage at a second location, wherein the first location is different than the second location, and a chain data manager positioned outside the blockchain network including the blockchain nodes and configured to monitor at least one parameter of the blockchain;

a set of blockchain nodes operating on the blockchain network comprising blockchain network compute resources and blockchain network storage resources, communicatively coupled to the node synchronization automation module, further comprising:

a downloader and uploader for securely uploading captured snapshots to a snapshot storage of at least one of the at least two snapshot storages and downloading the updated snapshot from the snapshot storage; and a blockchain node, provided with a snapshot service, for capturing a snapshot of a chain state, wherein the snapshot storage is communicatively coupled to the downloader and uploader for storing the captured snapshot and updating the stored snapshots;

wherein the node synchronization automation module is configured to, using the at least one processor and the memory outside of the blockchain network and independent of the blockchain network compute resources and the blockchain network storage resources, synchronize a new node with the set of synchronized blockchain nodes by mounting snapshots as a virtual disk to a plurality of nodes, from the set of synchronized blockchain nodes, with which the new node is to be synchronized;

wherein the snapshot service is configured to capture a snapshot after predefined time, and incrementally update the captured snapshot; and wherein each snapshot is stored at the at least one of the at least two snapshot storages.

2. The system of claim 1, wherein the set of blockchain nodes are connected within a blockchain network, and wherein the blockchain network is distributed at one or more cloud service providers.

3. The system of claim 2, wherein each of the one or more cloud service providers comprises the snapshot service, and wherein each snapshot service corresponding to each cloud service provider of the blockchain network is synchronized with each other.

4. The system of claim 1, wherein each snapshot is labeled with information attributes including a timestamp and a blockchain node identifier.

5. The system of claim 1, wherein the predefined time interval for snapshot generation is based upon a node synchronization policy.

6. The system of claim 1, wherein the blockchain network is implemented as one or more virtual servers with an Application Programming Interface (API) container.

7. The system of claim 6, wherein at least one virtual server is connected to a private cloud-based data storage, and wherein the cloud-based data storage is a chain data disk corresponding to at least one node.

8. The system of claim 6, wherein at least one virtual server is connected to bare-metal cloud service, and wherein the bare-metal cloud-based data storage is a chain data disk corresponding to at least one node.

9. The system of claim 1, wherein the snapshot storage is a cloud storage container.

10. The system of claim 1, wherein the set of blockchain nodes is stored at one location having a snapshot storage, and wherein nodes from the set of blockchain nodes are synchronized based on a snapshot stored at the snapshot storage.

11. The system of claim 10, wherein a location of a cloud service provider hosting a plurality of sets of blockchain nodes comprises a snapshot storage dedicated to the location.

12. The system of claim 10, wherein at each location comprises the downloader and uploader dedicated to the location, and wherein the downloader and uploader is cloud-independent component.

13. The system of claim 10, wherein blockchain nodes from the one or more clusters are synchronized by using the node synchronization automation module irrespective of location and blockchain platform infrastructure of the one or more clusters.

14. The system of claim 10, wherein one or more snapshot storages, corresponding to different locations where the set of blockchain nodes are implemented, are synchronized, for updating snapshots, based on a label respective to each snapshot storage.

15. The system of claim 10, wherein one or more snapshot storages are synchronized with a central snapshot storage.

16. The system of claim 10, wherein one or more snapshot storages are synchronized with each other connected in a peer-to-peer network.

17. The system of claim 1, wherein the blockchain network comprises a first blockchain platform infrastructure and a second blockchain platform infrastructure, wherein the first blockchain platform infrastructure and the second blockchain platform infrastructure are different.

18. A method, to implement a system for synchronizing a plurality of blockchain nodes operating on a blockchain network, the blockchain network comprising blockchain network compute resources and blockchain network storage resources, using a snapshot, comprises:

capturing, using at least one processor operably coupled to memory, a snapshot of a blockchain node in accordance with predefined synchronization policy;

uploading, using the at least one processor, the captured snapshot on a snapshot storage;

overwriting, using the at least one processor, a blockchain snapshot file with a new version of the captured blockchain snapshot file at the snapshot storage;

managing the synchronizing by a node synchronization automation unit positioned outside the blockchain network including the plurality of blockchain nodes including by:

initializing, using the at least one processor outside of the blockchain network and independent of the blockchain network compute resources and the blockchain network storage resources, a new dedicated blockchain node deployment;

installing, using the at least one processor outside of the blockchain network and independent of the blockchain network compute resources and the blockchain network storage resources, a set of computer readable executable instructions, to access a blockchain network, on a dedicated workload;

creating, using the at least one processor outside of the blockchain network and independent of the blockchain network compute resources and the blockchain network storage resources, a virtual disk from the blockchain snapshot file;

mapping, using the at least one processor outside of the blockchain network and independent of the blockchain network compute resources and the blockchain network storage resources, virtual disk to dedicated workload;

initializing, using the at least one processor outside of the blockchain network and independent of the blockchain network compute resources and the blockchain network storage resources, the set of computer readable executable instructions with a source of synchronized blockchain data on a mapped virtual disk, wherein the source of synchronized blockchain data is at least one of a first snapshot storage at a first location, or a second snapshot storage at a second location, wherein the first location is different than the second location.

19. The method of claim 18, wherein the blockchain network comprises a first blockchain platform infrastructure and a second blockchain platform infrastructure, wherein the first blockchain platform infrastructure and the second blockchain platform infrastructure are different.

20. The method of claim 18, wherein the plurality of blockchain nodes are connected within a blockchain network, and wherein the blockchain network is distributed at one or more cloud service providers.

* * * * *